United States Patent Office 3,396,473
Patented Aug. 13, 1968

3,396,473
METHOD OF DESORBING VAPORIZABLE LIQUIDS FROM SORPTIVE MATERIAL
Robert B. Turner, Midland, Mich., assignor to The Dow Chemical Company, Midland, Mich., a corporation of Delaware
No Drawing. Filed Aug. 3, 1966, Ser. No. 569,838
4 Claims. (Cl. 34—1)

ABSTRACT OF THE DISCLOSURE

This invention relates to a method for removing vaporizable liquids, such as chlorinated hydrocarbons, from contaminated electrically conductive sorptive materials, such as porous carbon, by passing an electric current through a bed of such conductive materials to heat them by electrical resistance to a temperature above about 1.5 times the boiling point of the sorbed liquid.

---

This invention relates to a method of desorbing vaporizable liquids from sorptive material and more particularly is concerned with a method of desorbing the vaporizable liquid from sorptive material contaminated therewith by passing an electrical current through the sorptive material.

The use of various sorptive materials, such as activated charcoal, to adsorb various vaporizable materials such as chlorinated hydrocarbons, carbon dioxide, water, esters, alcohols, ethers, aldehydes, ketones, organic acids, gaseous inorganics and the like, is well known. Until now, methods of desorbing the adsorbed matter from the sorptive material included applying heat from external sources or passing live steam or heated gases through the contaminated sorptive material. In general, these prior methods have at times been uneconomical, incomplete and difficult to implement.

For example, the use of heat from an external source requires a heating-up period during which time the applied heat permeates a bed of contaminated sorptive material, thereby volatilizing the vaporizable matter in the bed. As larger beds of sorptive materials are employed, markedly increased heating-up times are required which make the procedure time-consuming, incomplete and uneconomical for many applications. In addition, the higher temperatures required at the outer perimeter of the bed in order to sufficiently heat the center of the bed produce an undesirable temperature gradient across the bed and tend to decompose the material sorbed thereon.

The use of live steam for desorbing contaminated sorptive material will frequently cause hydrolysis of the adsorbed material or create other undesirable chemical reactions. For example, in attempting to remove chlorinated hydrocarbons from a sorptive material, live steam will often react with the chlorocarbon to produce hydrogen chloride, phosgene or other undesirable products. Likewise, with stabilized chlorinated hydrocarbons, a loss of stabilizer is often found due to retention in the carbon bed and due to the solubility of many such stabilizers in the aqueous phase.

The use of heated gases for the purpose of desorbing volatile matter from contaminated sorptive materials has similar limitations. If heated air is used, the reaction of oxygen with the adsorbed material can create unwanted and detrimental reaction products and the use of heated inert gases is usually not economically feasible, especially when large amounts of material need to be processed.

It is a principal object of the present invention to provide a method of desorbing volatilizable liquids from sorptive materials which is economical, provides substantially complete desorption and is relatively easy to carry out.

Another object is to provide a method of desorbing volatile liquids from sorptive materials wherein the volatile liquid and/or the sorptive material can be reclaimed substantially intact with virtually no side-products being formed.

A still further object of the invention is to provide a process for desorbing volatile liquids from sorptive materials wherein the bed of sorptive material is uniformly heated in situ to produce desorption without the employment of a degrading thermal condition.

Other objects and advantages of the method of the present invention will become apparent from reading the following detailed description.

It now unexpectedly has been discovered that sorbed vaporizable liquids, particularly electrically non-conductive organic liquids, may be removed from conductive sorptive material by passing sufficient electrical current through the contaminated sorptive material to heat the sorptive material to a temperature such that the temperature of the sorbed liquid in contact therewith is raised sufficiently to volatilize the sorbed liquid from the sorptive material. Usually, to achieve satisfactory desorption of the sorbed liquid, it is necessary to pass sufficient current through the contaminated sorptive material to produce a temperature which is from about 1.5 to about 3 times the boiling point of the sorbed liquid. In those instances where it is desired to remove substantially all sorbed liquid from the sorptive material and where the sorbed liquid is not to be recovered, higher temperatures may be used so long as they do not decompose the sorptive material or cause reaction between the sorptive material and the sorbed liquid or its thermal decomposition products upon heating of the sorptive material to the desired temperature. The sorbed liquid is allowed to evolve from the sorptive material and the sorptive material is recovered substantially free of said sorbed liquid. In the process of this invention, the current to the sorption bed may be controlled such that the sorbed liquid may be recovered in substantially pure form and likewise controlled such that the sorption bed is not detrimentally attacked or degraded. In this manner, therefore, many of the problems inherent in present art processes are overcome.

In carrying out one embodiment of the present process, a contaminated, conductive, high resistance sorptive material is placed in an electrically nonconductive vessel. Two electrodes connected to a power source, are then positioned in the vessel in contact with the conductive sorptive material and current is then passed through the bed of sorptive material. The electric current causes heating of the conductive high-resistance material, thereby evolving the vaporizable sorbed matter. The vapors are then collected, condensed or otherwise disposed of.

Sorptive materials that can be desorbed using the instant method include those which are conductive enough to allow the passage of some current, but which must have a high enough resistance to become heated by the current to a predetermined temperature, below the temperature at which any detrimental degradation of the sorptive material occurs. Examples of such sorptive materials which can be decontaminated by using the present invention include activated coconut charcoal, other carbonaceous material such as charcoal, graphite, coke and the like, slightly conductive metal oxide sorptives including alumina, silica and clays.

Sorbed materials which can be liberated from the aforementioned sorptive materials are vaporizable liquids and preferably non-conductive organic liquids that vaporize and evolve when heated but do not decompose or react with the sorptive material as the bed temperatures employed in the desorption process. Examples of such sorbed liquids include chlorinated hydrocarbons such as trichloroethylene, perchloroethylene, ethylene dichloride, 1,1,1,-trichloroethane, 1,1,2-trichloroethane, carbon tetrachloride and the like, other organics that are vaporizable including ketones such as dimethyl ketone, methyl ethyl ketone and methyl isopropyl ketone, aldehydes such as formaldehyde, acetaldehyde, propionaldehyde, acrolein and glyoxal, organic acids such as acetic acid, formic acid, propionic acid, and acrylic acid, alcohols such as methyl alcohol, ethyl alcohol, butyl alcohol, and allyl alcohol, ethers such as diethyl ether, diphenyl ether and lower molecular weight polyethers such as polyethylene glycols and polypropylene glycols, esters such as ethyl acetate, ethyl propionate and butyl acrylate and water.

The electrical current used to heat the sorptive material can be direct or alternating. The amount of voltage and amperage used herein will vary depending upon the electrical resistance of the sorptive material, the degree of contact between the various particles thereof, the temperature required to desorb the sorptive material, the mass of the sorptive material and the quantity of sorbed material contained therein. Likewise, the amount of time electric current is passed through the sorptive material depends for the most part on the depth of the sorptive material being treated and upon the temperature required. It is usually possible, however, when the electric current is properly applied, to cause evolvement of the sorbed material in less than about an hour. The depth of mixture to be treated should preferably be no greater than the distance between the electrodes.

In order to insure uniform distribution of current throughout the sorptive material, thereby producing the best results, the sorptive particles should be uniformly arranged in the vessel with good contact between the individual particles. In addition, the electrodes should be in contact with ample surface area of the sorptive material.

The following examples are merely illustrative of the instant invention and in no way are meant to limit it thereto.

Example 1

A glass column 4 inches in internal diameter and 24 inches long was filled with about 2500 grams of 4 x 10 mesh carbon (Pittsburg Coke). Copper plate electrodes were then positioned at each end of the column to make contact with the carbon, to apply pressure to the carbon bed and to hold it in place. A thermowell was provided through the length of the carbon bed and four thermocouples equally spaced between the upper and lower ends of the column. An inlet line was provided in the bottom of the column and an outlet line was provided in the top to allow the passages of gases into and out of the column. The outlet line was provided with a cooled condensing portion and a receiver to condense and collect vapors passing from the column.

Prior to conducting the experiment, all water was removed from the bed by passing current through the bed to raise its temperature to about 480° C. while passing a stream of nitrogen therethrough. The bed was then cooled in a nitrogen atmosphere and trichloroethylene vapor was passed therethrough until the bed was saturated. It was found that the bed had adsorbed 1407 gram of trichloroethylene.

Current was then applied across the bed by supplying 17 volts and 20 amps between the copper electrodes. As heating of the bed continued and the trichloroethylene was desorbed therefrom, it became necessary to increase the voltage gradually up to 40 volts while maintaining a constant current of 20 amps. The column was allowed to heat until it achieved an average maximum temperature of 353° F. This required about 49 minutes and about 397 watt hours. It was found that 695 gram of trichloroethylene had been desorbed from the carbon and collected in a receiver. Analysis of the desorbed material showed no sign of decomposition and degradation. Continued heating from a longer period of time provides for removal of the remaining trichloroethylene from the bed.

Example 2

In a manner similar to that of Example 1, 920 grams of methylene chloride were absorbed by the carbon bed. Power was applied to the bed and a maximum average temperature of 343° F. was achieved in about 44 minutes with the expenditure of about 376 watt hours of power. It was found that 646 grams of methylene chloride had been desorbed from the carbon and collected in the receiver. Analysis of the desorbed material showed no sign of decomposition or degradation.

Example 3

In a manner similar to that of Example 1, 1182 grams of methylene chloride were absorbed by the carbon bed. Power was applied to the bed and a maximum average temperature of 455° F. was achieved in about 88 minutes with a consumption of 671 watt hours of power. It was found that 1089 grams of methylene chloride had been desorbed by the carbon and collected in the receiver. Analysis of the product showed some decomposition of the methylene chloride due to the high final bed temperature employed.

Example 4

In the same general manner as Example 1, about 70 grams of activated coconut charcoal which was contaminated to about its saturation point with trichloroethylene containing minor amounts of vaporizable impurities was placed in a one liter glass beaker. Two graphite electrodes connected to a D.C. power pack were placed in contact with the contaminated charcoal at opposing sides of the beaker. A direct electrical current of about 30 amperes (6 volts) was passed through the contaminated charcoal. The current was applied until a maximum temperature of about 300° F. was reached. This temperature was achieved in less than a minute and the power to the electrodes was terminated. The charcoal was found to be substantially free from trichloroethylene or any of the impurities which were contained therein. Likewise, the trichloroethylene product was found to contain substantially no evidence of decomposition or degradation.

Thus it is seen that substantially all of the sorbed material was evolved from the charcoal in a very short period using the instant method.

In a manner similar to the foregoing other sorbed materials such as water, other chlorinated hydrocarbons such as ethylene dichloride, methylene chloride and perchloroethylene, other organic compounds such as ethyl alcohol, and methyl ethyl ketone are removed from the sorptive material by the process of this invention. In addition, those sorbed materials mentioned hereinbefore can be removed from sorptive materials such as charcoal, graphite, alumina and other sorptive materials, mentioned hereinbefore.

Various modifications can be made in the method of the instant invention without departing from the spirit or scope thereof for it is to be understood that I limit myself only as defined in the appended claims.

I claim:
1. A method of removing vaporizable sorbed liquids from electrically conductive contaminated sorptive materials which comprises
    (a) passing sufficient electrical current through the contaminated sorptive material to heat the sorptive material by electrical resistance to a temperature above about 1.5 times the boiling point of the vaporizable sorbed liquid, and
    (b) allowing said vaporized liquid to evolve from the sorptive material.
2. The method in accordance with claim 1 wherein the sorptive material is heated to a temperature between about 1.5 and 3.0 times the boiling point of the sorbed vaporizable liquid.

3. The method in accordance with claim 1 wherein said sorbed matter is trichloroethylene and said electrically conductive sorptive material is particulate carbon.

4. The method in accordance with claim 1 wherein said sorbed matter is methylene chloride and said electrically conductive sorptive material is particulate carbon.

References Cited

UNITED STATES PATENTS 2,949,677   8/1960   Cameron _____ 34—1

FOREIGN PATENTS 517,798   2/1940   Great Britain.

JOHN J. CAMBY, *Primary Examiner.*